US007779930B2

(12) United States Patent
Lohmann et al.

(10) Patent No.: US 7,779,930 B2
(45) Date of Patent: Aug. 24, 2010

(54) HYDRAULIC IMPACT HAMMER WITH OVERPRESSURE AND PISTON-OVERTRAVEL PROTECTION

(75) Inventors: Stefan Lohmann, Mulheim (DE); Karlheinz Fritz, Sprochkhovel (DE); Reiner Koch, Mulheim (DE); Markus Mellwig, Hagen (DE); Hendrik Moller, Selm (DE); Uwe Autschbach, Oberhausen (DE)

(73) Assignee: Atlas Copco Construction Tools GmbH, Essen (DE)

( * ) Notice: Subject to any disclaimer, the term of this patent is extended or adjusted under 35 U.S.C. 154(b) by 466 days.

(21) Appl. No.: 11/658,071

(22) PCT Filed: Jul. 2, 2005

(86) PCT No.: PCT/DE2005/001166

§ 371 (c)(1), (2), (4) Date: Jan. 19, 2007

(87) PCT Pub. No.: WO2006/007811

PCT Pub. Date: Jan. 26, 2006

(65) Prior Publication Data

US 2008/0296035 A1 Dec. 4, 2008

(30) Foreign Application Priority Data

Jul. 21, 2004 (DE) ....................... 10 2004 035 306

(51) Int. Cl.
*B23Q 5/26* (2006.01)

(52) U.S. Cl. ....................................... 173/177; 173/115

(58) Field of Classification Search ................. 173/177, 173/155, 206, 207, 89; 91/39, 37, 50
See application file for complete search history.

(56) References Cited

U.S. PATENT DOCUMENTS

| | | | | |
|---|---|---|---|---|
| 4,899,836 | A * | 2/1990 | Vernot | 173/207 |
| 4,967,553 | A * | 11/1990 | Barthomeuf | 60/371 |
| 5,174,387 | A | 12/1992 | Arndt | 173/1 |
| 5,667,022 | A * | 9/1997 | Gude | 173/105 |
| 5,860,481 | A * | 1/1999 | Prokop et al. | 173/207 |
| 5,893,419 | A | 4/1999 | Hodges | |
| 6,334,495 | B2 * | 1/2002 | Deimel et al. | 173/207 |
| 6,491,114 | B1 * | 12/2002 | Webel | 173/206 |
| 6,959,967 | B1 | 11/2005 | Prokop | 299/69 |

* cited by examiner

*Primary Examiner*—Rinaldi I. Rada
*Assistant Examiner*—Nathaniel Chukwurah
(74) *Attorney, Agent, or Firm*—Andrew Wilford

(57) ABSTRACT

The invention relates to a striking device (5) comprising a striking mechanism (8) which is driven by a pressure medium. Said device comprises a percussion piston (13) which can be displaced back and forth by means of a control device and a control valve which is embodied as a pressure shut-off valve (19) or as a stop valve, said control valve automatically stopping the striking mechanism if it exceeds a predetermined maximum value based on the working pressure controlling the inlet line, blocking the pressure line (3) or maintaining the control device in one of the and positions thereof. The inventive striking device also comprises a hydraulic catcher buffer which is used to brake the percussion piston when it exceeds a predetermined impact plane. According to the invention, the control valve must remain deactivated at least as long as the percussion piston is displaced on the hydraulic catcher buffer.

13 Claims, 16 Drawing Sheets

HYDRAULIC IMPACT HAMMER WITH OVERPRESSURE AND PISTON-OVERTRAVEL PROTECTION

CROSS REFERENCE TO RELATED APPLICATIONS

This application is the US national phase of PCT application PCT/DE2005/001166, filed 2 Jul. 2005, published 26 Jan. 2006 as WO2006/007811, and claiming the priority of German patent application 102004035306.9 itself filed 21 Jul. 2004, whose entire disclosures are herewith incorporated by reference.

FIELD OF THE INVENTION

The invention relates to a fluid-powered impact device, especially a hydraulic hammer.

BACKGROUND OF THE INVENTION

A typical such fluid-powered impact mechanism is provided with a hammer piston that can be moved back and forth by means of a controller, and a guide unit on which the impact mechanism is carried. Furthermore, the impact device is provided with a control valve, designed as pressure-limiting valve (PSOV) or shutoff valve automatically deactivating the impact mechanism if the working pressure caused by the inlet pressure exceeds a predetermined maximum value/peak value by either blocking the pressure line or stopping the controller in one of its end positions, that is either in the position of the working stroke or of the return stroke. Finally, the impact mechanism is provided with a hydraulic stop buffer for decelerating the hammer piston when a predetermined impact area is passed.

The above-described device is known from EP 0 934 804 A2 (U.S. Pat. No. 6,959,967).

Fluid-powered impact devices, particularly those serving for milling stones, concrete or other construction materials are mostly used as additional or attached devices for construction machines such as excavators, loader or other carrier units. The connection of a impact device to a boom of a hydraulic excavator and the supply of the impact device by means of a pressure line as well as a return line are already described in DE 40 36 918 A1 (U.S. Pat. No. 5,174,387). The guide unit carrying the impact mechanism can be designed as a housing (hammer box) or as a supporting frame. The impact device consists of a cylinder in which a hammer piston is guided, a cylinder cover and a lower part of the hammer in which the chisel or the insertion end is mounted by means of wear is bushings.

The hammer piston is designed as a differential piston, i.e. it is provided with two oppositely directed annular actuator faces of different sizes. The lower actuator face, by means of which the return stroke is triggered when a pressurization takes place, is continuously pressurized with a predetermined operating pressure. The upper actuator face, by means of which the advance stroke is initiated by pressurization, is pressurized with the operating pressure or relieved to the sump pressure depending on the position of the spool valve. The advance stroke can be realized, since the upper annular actuator face is larger than the other, thus, pressurization with the operating pressure results in a force acting in striking direction. During the so-called advance stroke, the moving piston displaces the oil displaced by the smaller annular actuator face toward a chamber above the larger upper annular surface, which is also pressurized with the oil coming from the pump. During the return stroke, the oil from the pump flows only in the direction of the actuator face with smaller dimensions, whereas the oil from the actuator face with larger dimension is discharged by means of a throttle or an orifice providing an equilibrated operation of the hammer.

In particular, the impact mechanisms mentioned here are provided with a gas buffer, namely a chamber under gas pressure, into which the upper end face of the piston engages. The gas pressure in the chamber acts as an additional force on the piston in direction of the advance stroke. The part of the piston positioned at the other end of the piston, including the end face there or the striking surface reaches into a so-called striking chamber that is connected to the atmosphere.

Depending on the actuation position, the spool valve mentioned above which is preferably positioned in the cover either connects the actuator face with larger dimensions to the supply line such that the operating pressure is applied to it or during the return stroke depressurizes the surface by means of a line connecting the return line to the sump.

In addition, the spool valve of the control valve can be provided with a piston with two actuator faces, one of the surfaces or partial surfaces being constantly pressurized with a supply line pressure and the other surface being optionally either pressurized with or relieved of the supply line pressure; in the latter event, a connection to the sump is opened. Thanks to the different sizes of the actuator faces, the spool valve can be moved into one of its end positions.

The pressure-limiting valve or pressure-relief valve described in EP 0 934 804 A2 is connected to the pressure line pressurized with the working pressure and automatically deactivates the impact mechanism if the working pressure exceeds a predetermined peak value created by the operating pressure, by blocking either the pressure line or the controller in one of its end positions, namely the full-forward or the full-rearward position. Thus, it is guaranteed that the impact device is not exposed to inadmissibly high forces.

If the chisel does not engage the material to be broke up or if the chisel penetrates deeply into the material when a stroke is carried out, the piston passes its predetermined (theoretical) stroke impact area in the direction of the advance stroke and after a certain overtravel penetrates with its lower actuator face or the lower large-diameter portion, into a hydraulic stop buffer decelerating the piston before it can hit the lower part. This way, the impact on the components is reduced and damages are avoided.

The theoretical impact area describes the area where the lower front surface of the piston touches the upper back face of the chisel when the chisel is positioned at the abutment, i.e. in the theoretical impact position. Passing the theoretical impact area means the piston is positioned such that the lower end face of the piston is positioned below or above (during the return stroke) (during the return stroke) the theoretical impact area.

The pressure line can be blocked by the control valve or the controller can be stopped in one of its end positions as a preventative measure to avoid damage; for if the operating pressure is too high, the piston is accelerated too much and thus the level of stroke energy becomes too high. The above-described embodiment, however, has the following disadvantage: If the chisel does not contact the material to be destroyed or if the chisel penetrates (too) deeply into the material when advancing, the piston passes its theoretical impact area to a certain extent and penetrates into the hydraulic stop buffer with its lower actuator face or the large-diameter portion. In order to move the piston rearward out of the buffer, the hydraulic medium has to get into the chamber is below the actuator face with smaller surface by means of a supply line.

Due to the piston passing the theoretical impact area, the hydraulic medium can only flow through a small gap between the lower large-diameter portion and the cylinder bore. The gap represents a comparatively high resistance in the sense of a throttle, by means of which the pressure in the pressure line connected to the annular chamber mentioned above is increased and thus reaches a level exceeding the level of operating pressure allowed, which again results in the pressure-limiting valve being actuated. This means that the hydraulic hammer is unintendedly switched off when the hammer piston is lifted.

OBJECT OF THE INVENTION

It is the object of the present invention to eliminate this disadvantage.

SUMMARY OF THE INVENTION

For the solution of the objective, the fluid-powered impact device of the invention is characterized in that the control valve or the pressure-limiting valve remains deactivated until the hammer piston is moved out of the hydraulic stop buffer. Thanks the pressure in the signal line of the control valve being reduced to a level below the shut-off pressure set for the control valve, unintended deactivation is avoided so that, after penetrating into the buffer, the piston can be safely moved out of the buffer during the return stroke. Deactivation should only be carried out in extreme situations, for example not if the hammer operates on hard material and the hammer piston does not significantly pass its theoretical impact area. In such cases the pressure-limiting valve is required to remain active for protecting the hammer. Several solutions are possible for reducing pressure.

Thus, the pressure in the signal line may be reduced by providing a connection of the signal line with the return line, where, at the same time, the connection to the supply line is throttled or disconnected.

Preferably, the pressure-limiting valve is to be deactivated when the theoretical impact area is passed to a concrete degree in the forward impact direction. This may be detected by a bore positioned in a working cylinder at a suitable position, the closing or opening of the bore by the hammer piston being provoked by appropriate regulation (pressure reduction in the signal line).

Only when the operation condition has changed such that it may be assumed that the pressure was reduced to a normal level with correct input quantity and the values in the signal line are such that they do not result in the actuation of the pressure-limiting valve, the pressure is no longer reduced and the pressure-limiting valve for the protection of the impact device is reactivated. The signal for stopping reduction of the pressure may be triggered by moving the large-diameter portion out of the hydraulic buffer or by passing the theoretical impact area to a certain extent in the reverse return direction. The present invention also relates to such fluid-powered impact devices that are equipped with an automatic stroke-length reversal allowing for the hammer piston to carry out strokes of different length and thus allowing for a variation of the strike energy per strike. In addition to the transverse bore acting as a control line, which is called the long-stroke bore in impact devices, a second, lower transverse bore, namely the short-stroke bore, is provided. If the chisel does not directly contact the material to be destroyed or if the chisel penetrates deeply into the material when a stroke is carried out, the piston passes its theoretical impact area to a certain extent, and after covering a certain distance it establishes a connection with a transverse bore, the stroke-length reversal bore. By means of the pressure relief of the stroke-length reversal bore, a connection between the long-stroke bore and the short-stroke bore is established, so that the short-stroke bore also becomes active. Thus, during the return stroke, the spool valve is already put into advance stroke position when the large-diameter portion uncovers the lower short-stroke bore and connects it to the operating pressure acting on the lower actuator face of the piston. According to the invention, the control line of the pressure-limiting valve is no longer connected to the supply line but to the stroke-length reversal line. As soon as the piston passes the theoretical impact area in forward direction to a certain extent and penetrates into the hydraulic stop buffer, the line connected to the stroke-length reversal bore; and thus the signal line of the power shut-off valve is relieved toward the supply line by the existing turning motion of the piston. Thus, the power shut-off valve is deactivated.

If the lower large-diameter portion during the return stroke covers the stroke-length reversal bore and thus disconnects the connection to the return line, the stroke-length reversal line, according to one embodiment of the invention, is connected to the control line by means of a holding bore in the stroke-length reversal valve, which control line is connected to the return line when the spool valve is in return stroke position.

If, after the deactivation of the shut-off valve, the control switches to the advance stroke, the operating pressure acting in the control line is conducted into the stroke-length reversal bore by means of the holding bore in the stroke-length reversal valve, subsequent to which process the stroke-length reversal valve switches into the long-stroke position, in which position the holding bore connects the stroke-length reversal line with the pressure line. With the bore in the stroke-length reversal valve a certain pressure level in the stroke-length reversal bore is also maintained when the stroke-length reversal bore is closed by the piston and that the holding valve is reset from the short-stroke position into the long-stroke position. If the piston reaches a certain position above the top short-stroke dead point, the piston clears the stroke-length reversal bore and connects the bore with the lower supply groove connected to the supply line.

In case of bigger hammers, the long or short-stroke bores are not directly connected to the spool valve but a shutoff valve is provided that connects the control line to the spool valve, depending on the pressure level in the long-stroke bore. The pressure-limiting valve in the control line is either positioned is between the holding valve and the spool valve or between the shutoff valve and the long-stroke bore.

In the control line between the working cylinder central compartment and the spool valve, in which the signal for changing the setting of the spool valve depending of the position of the piston is applied, a shutoff valve is preferably provided connecting the line section on the side of the spool valve to the supply line or the return line, depending on the pressure in the line section on the side of the working cylinder central compartment. In this connection, the pressure-limiting valve is either provided between the shutoff valve and the spool valve or between the central compartment of the working cylinder and the shutoff valve.

According to a further embodiment of the invention it is provided that the piston uncovers a throttled connection between a line connected to the supply line and a line connected to the return line once the hammer piston has passed its top or bottom dead end (or the impact position) to a certain extent.

Preferably, the control valve has a control area that after being deactivated is connected to a pressure level such that an additional operation force is acting in deactivated position. Thus even after the reduction of the supply line pressure or the signal line pressure to a certain reset pressure, which is lower than the deactivation pressure set at the valve, the control valve is maintained deactivated.

BRIEF DESCRIPTION OF THE DRAWING

Further possible embodiments as well as advantages are described in the drawings. They show.

SPECIFIC DESCRIPTION

Figure 1A:
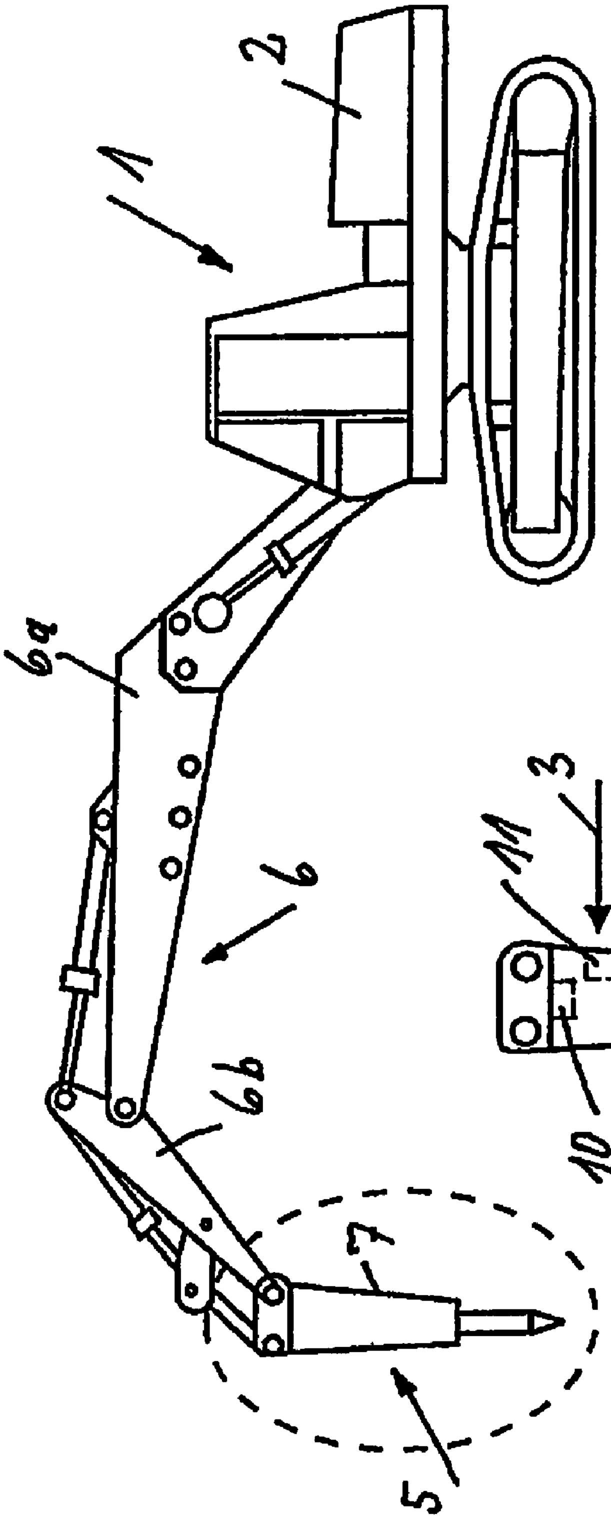
FIG. 1*a* schematically shows a carrier device designed as hydraulic excavator on which a fluid-powered impact device is adjustably mounted, FIG. 1*b* schematically shows the impact device shown in FIG. 1 as well as the controller and additional control valve.
Figure 1B:
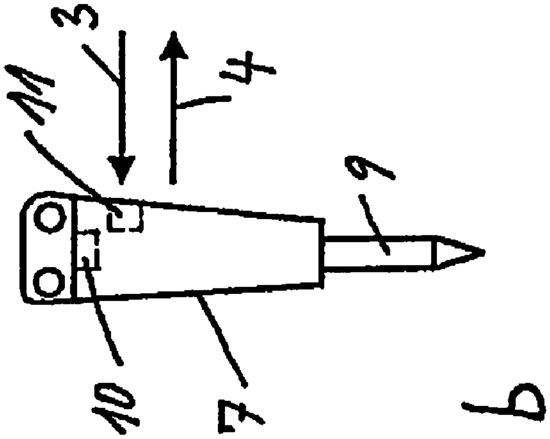

The hydraulic excavator 1 shown in FIG. 1*a* is provided with a supply unit 2 that essentially consists of a not shown Diesel engine and a hydraulic pump 17 driven by the engine and connected to a fluid-powered impact device 5 by means of a pressure line 3 such as known from, for example, DE 40 36 918 and a return line 4 (see FIG. 1*b*) without pressure, which impact device is held adjustably on a boom 6 of the hydraulic excavator by means of two extension arms 6*a* and 6*b*.

Figure 2:
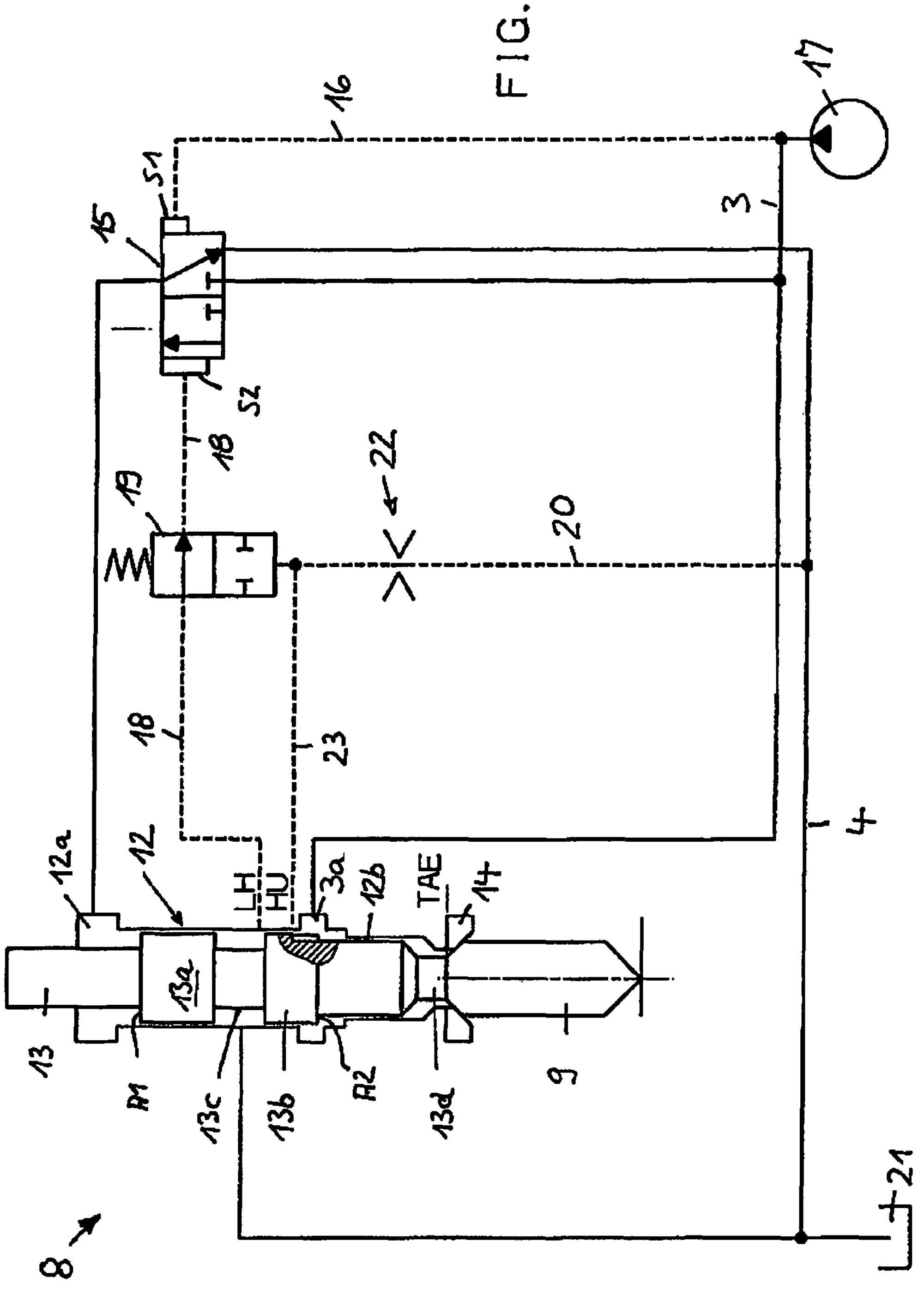
FIGS. 2-16 show schematic diagrams of the fluid-powered impact mechanism.

The impact device 5 has a support frame 7 that is pivoted on the boom arm 6*b* as a guide unit and in which a fluid-powered impact mechanism 8 is carried according to one of the embodiments of FIG. 2 to FIG. 15. The chisel 9 on which the impact mechanism acts projects from the support frame 7. As can be seen schematically from FIG. 1*b*, the impact device 5 is provided with a controller 10 and also with a control valve 11, designed as pressure controller for the adaptation to the hydraulic capacity of the supply unit 2. The control valve 11 may be a component of the support frame 7 or of the impact mechanism 8. The impact mechanism 8 according to FIG. 2 is provided with a working cylinder 12 in which a hammer piston 13 may be moved back and forth. The hammer piston 13 has two large-diameter portions 13*a* and 13*b* that are separated by a circumferential groove 13*c*. The axially oppositely directed piston faces A1 and A2 of the large-diameter portions 13*a* and 13*b* together with the working cylinder 12 delimit rear and front cylinder compartments 12*a* and 12*b*. The rear piston face A1 is larger than the front piston face A2. The hammer piston 13 at its lower end is formed with an end piece 13*d* which is juxtaposed with a tool formed by the chisel 9, the upward stroke of which is delimited by an abutment 14. In the illustrated embodiment, the position in which the hammer piston 13 with its end 13*d* meets the chisel 9 is the area TAE of the theoretical impact area.

For controlling the reversal of movement of the hammer piston 13 there is a control valve 15, the smaller slide area S1 of which is continuously pressurized with the working pressure p provided by the pump 17 by means of a line 16. The line 3 supplies the working pressure p to the front compartment 12*b*, so that the annular piston face A2 is pressurized with the pressure p.

A larger valve area S2 of the spool valve 15 is connected to the central compartment 13*c* of the working cylinder by a control line 18. The line 18 is connected to a bore LH opening into the central compartment 13*c* of the working cylinder 12, which, according to the illustration, is above the front portion 13*b* of the hammer piston 13. The control line 18 has a pressure-limiting valve 19 having a throttle line 20 connected to the return line 4, which again is connected to the sump 21. The throttle line 20 has a throttle or orifice 22, and a signal line 23 leads to the line 20 between the orifice 22 and the pressure-limiting valve 19, which signal line 23 is connected to a signal bore of the working cylinder 13.

The pressure-limiting valve 19 forms an overload or overpressure protector, automatically deactivating the impact mechanism if the input pressure exceeds a predetermined peak value or overpressure. As long as the chisel 9, however, does not directly contact the material to be destroyed or penetrates deeply into the material, operation conditions may be observed in which the piston can pass its theoretical impact area TAE to a certain extent; in this case the lower large-diameter portion 13*b* penetrates into the lower hydraulic stop buffer. In order to move the piston out of the buffer in the direction of the return stroke, oil flowing through the line 3 or the bore 3*a* has to flow through an annular gap between the lower large-diameter portion 13*b* and the cylinder bore into the hydraulic stop buffer in order to apply pressure to the lower piston actuator face A2. Thus, the gap throttles oil flow, which results in the pressure in the pressure line increasing. If the control line of the pressure-limiting valve 19 is connected to the pressure line 3, such as in the case of the embodiment according to EP 0 934 804 A2, this would result in an unintended deactivation of the hammer. If the piston does not pass the theoretical impact area TAE to a significant degree, the bore connected to the signal line 23 is permanently pressurized with the pressure applied in the front part of cylinder rear compartment 12*a* connected to the pressure line 3 by means of an axial groove in the large-diameter front portion 13*b*. If the hammer piston passes the theoretical impact area TAE to a certain extent, the large-diameter front portion 13*b* closes the bore connected to the signal line 23. Pressure in the signal line 23 is relieved into the return line by the line 20 and the throttle 22. Thus, actuation of the valve 19 is prevented, even if the pressure in the pressure line 3 rises to a level well above the shut-off pressure of the valve 19. This is prevented by the throttle line 20 by means of the throttle 22, which, when the hammer piston 13 is moved out of the hydraulic stop buffer, prevents the pressure in the signal line 23 from increasing and thus also prevents the pressure-limiting valve from being actuated.

Figure 3:
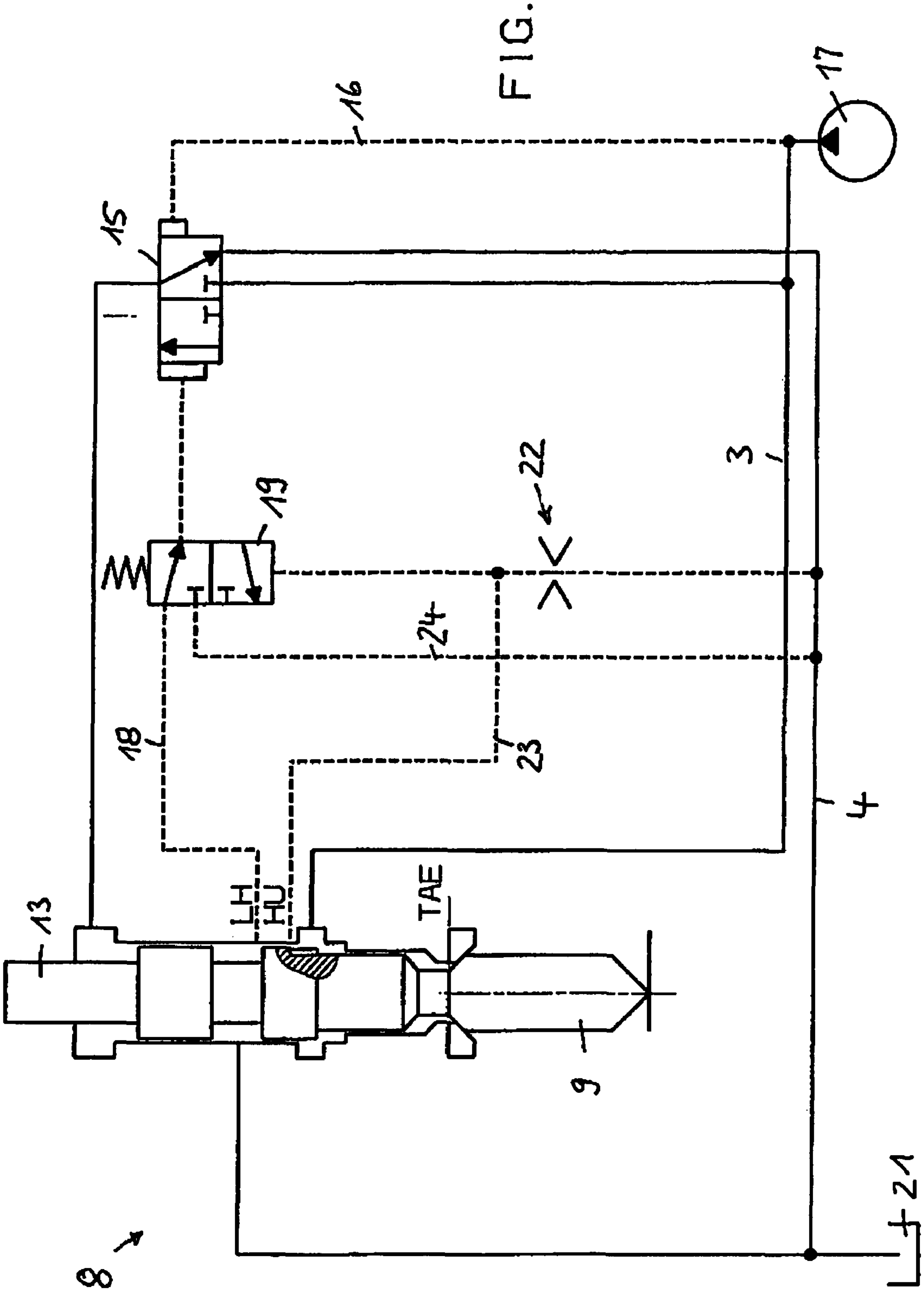

The embodiment according to FIG. 3 basically corresponds to the embodiment according to FIG. 2, except that the pressure-limiting valve is a 3/2 valve by means of which further signal transmission is stopped by disconnecting the connection from the bore LH via the line 18 and the spool valve 15 and also, by the line 24 forming a connection to the return line 4.

Figure 4:
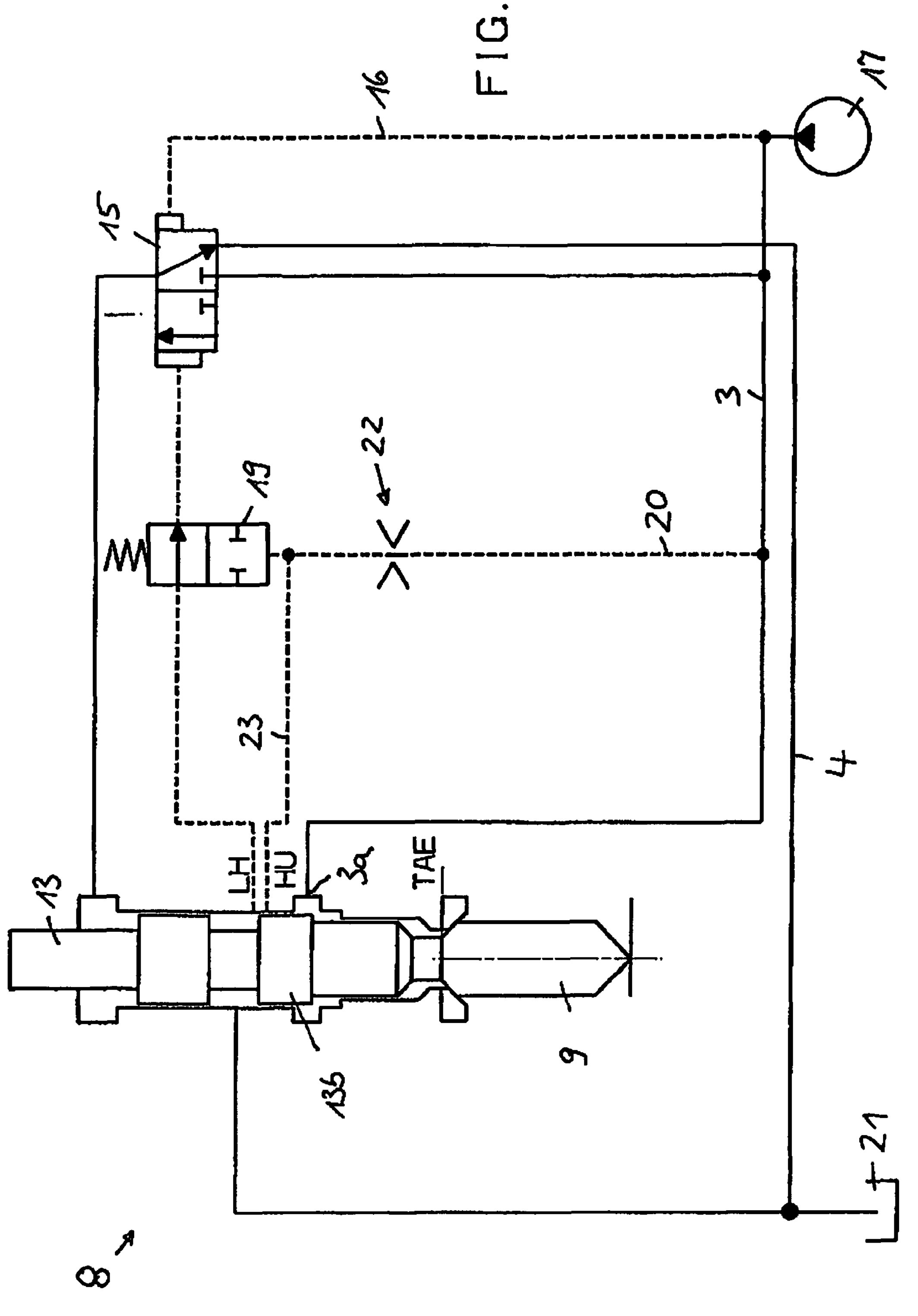

In the embodiment according to FIG. 4, which corresponds to the embodiment according to FIG. 2, the throttle line 20 having the throttle 22 is connected to the pressure line 3. The signal line 23, however, is connected to a bore that is uncovered by the front portion 13*b* when the piston passes the theoretical impact area TAE to a certain extent, so that a connection of the signal line to the return line is created. By means of the thus achieved reduction of the pressure, the pressure-limiting valve 19 is deactivated until the piston passes the bore HU with its large-diameter front portion 13*b* during the return stroke, so that the oil flowing over the line 3 and the line 20 through the throttle 20 from the supply line, reestablishes the operating pressure level in steps; thus, the pressure-limiting valve is no longer deactivated.

Figure 5:
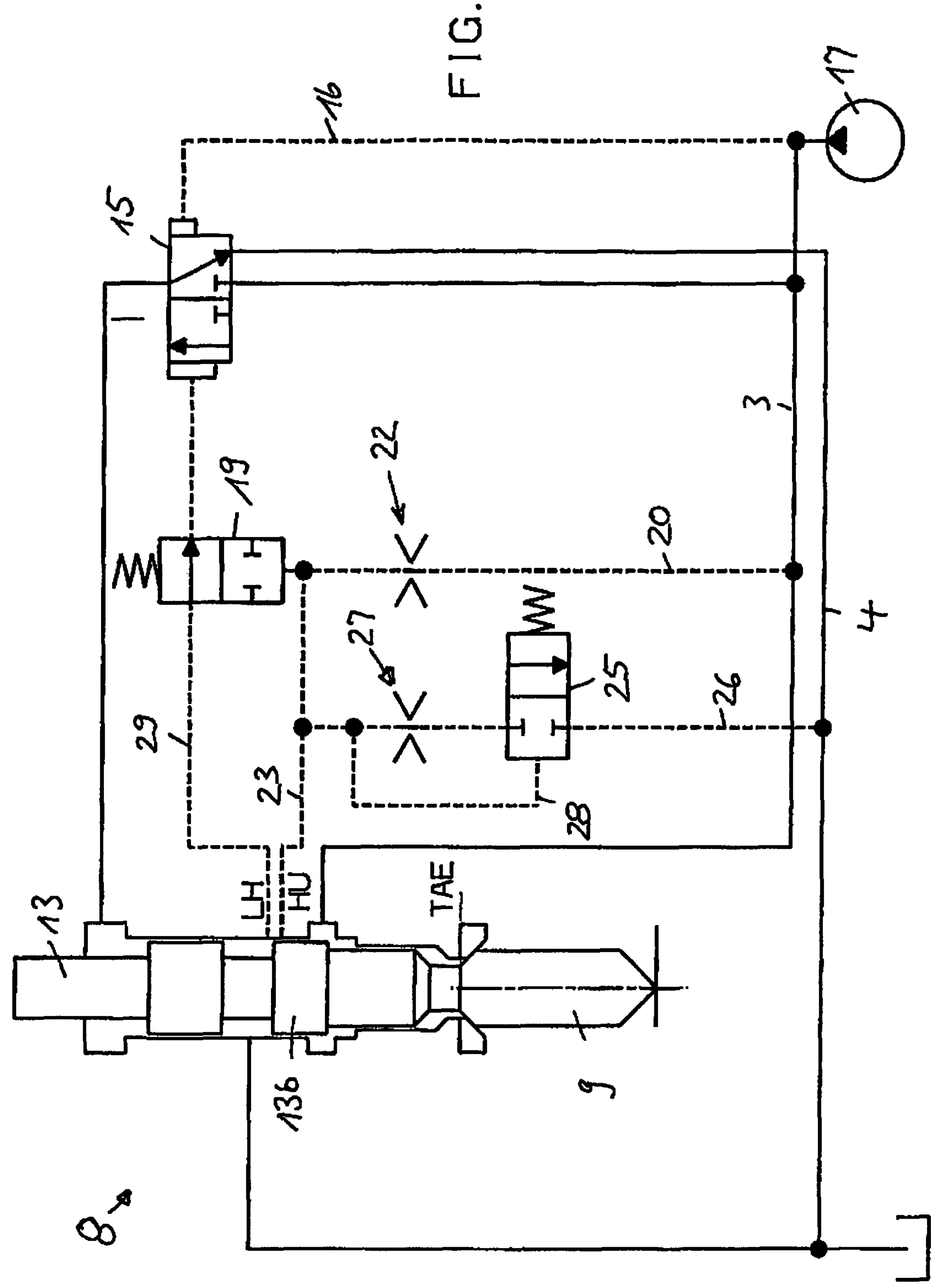

In the embodiment according to FIG. 5, in addition to the arrangement according to FIG. 4, a relief valve 25 is provided that is provided in a connection line 26 between the signal line 23 and the return line 4. In the connection line, a throttle 27 is also provided, the control line 28 of the relief valve 25 bridging the throttle. Pressure reduction in the signal line 23 takes place when the piston passes the position, by means of which the connection of the bore connected to the signal line 23 with the return line 4 is uncovered and oil is discharged from the signal line 23. During a subsequent return strike, the reduced pressure in the signal line 23 is maintained even in the bore closed by the piston by means of the relief valve 25 in open position. The throttle profiles, the profile of the connection between the signal line and the supply line and the actuating pressure of the relief valve 25 are selected such that the pressure in the signal line only reaches a level at which the relief valve is put into blocking mode once the piston has established a connection to the supply line during the return stroke. Alternatively, based on the embodiment according to FIG. 4, a pressure shutoff valve 30 may be provided in the line 20 that alternatively, depending on the actuating position of the signal line with the supply line (line section 20*a*) or the return line (line section 20*b*), establishes a throttle connection (see FIG. 6). The valve 30 is controlled by the pressure in the line 23 via the line section 31. If the piston 13 passes the theoretical impact area TAE to a certain extent, the stroke length reversal bore HU is uncovered by the large-diameter front portion 13*b* and connected to the return line 4. As a result, the pressure is reduced in the signal lines 23 and the control line 31 so that the pressure maintaining valve 30 switches into relief position thanks to a reset force, in which position the signal line is connected to the return line in a throttled state. During the subsequent return stroke of the piston 13, the reduced pressure in the signal line is maintained in the position in which the bore HU is closed. The throttle profiles, the profile of the connection between the signal line and the supply line, as well as the actuating pressure of the relief valve 30 are selected such that the pressure in the signal line reaches a level at which the relief valve is put into pressure mode when the piston 13 has established a connection to the supply line during the return stroke, i.e. the pressure shutoff valve 30 establishes a further throttled connection between the signal line and the supply line 3. During the subsequent advance stroke, the supply line pressure in the signal line is maintained even if the signal bore is covered by the piston. The throttle profile, the profile of the connection between the signal line and the supply line, and the actuating pressure of the relief valve 30 are selected such that, once the piston has established a connection of the signal line with the return line 4 during an idle stroke, the pressure in the signal line reaches such a level that the relief valve switches back into relief position.

Figure 7:
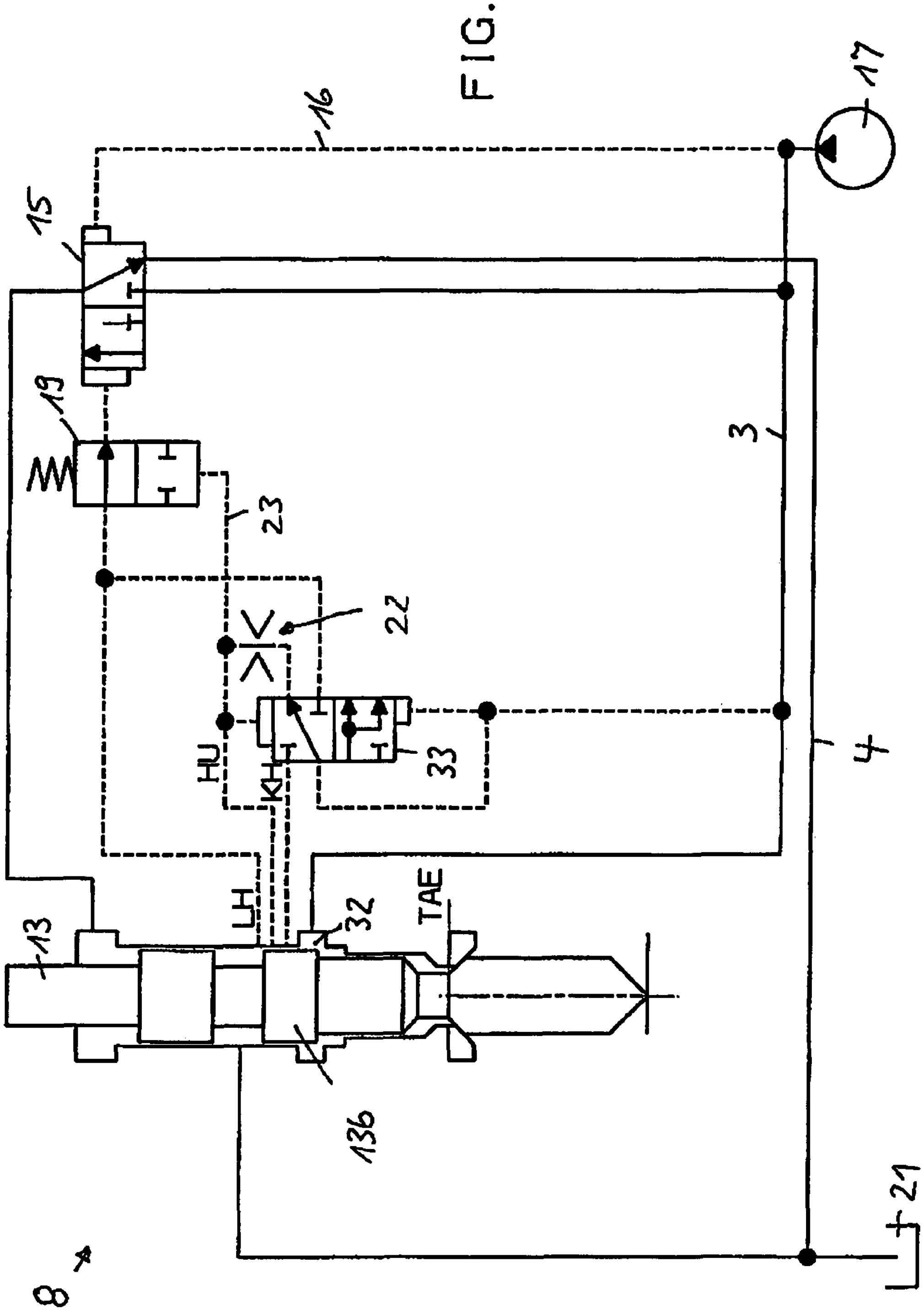

In the embodiment according to FIG. 7, the hammer is also provided with a stroke-length reversal by means of which the piston can alter the length of its strokes according to the operation condition. In this case as in the embodiments described above, the line 23 with the stroke-length reversal bore HU is used as a signal line. The stroke-length reversal bore is provided between the bores LH and KH, the stroke-length reversal bore being only uncovered by the large-diameter front portion 13*b* and connected to a return line 4 during the forward stroke, if the theoretical impact area is passed to a certain extent by the piston 13. The degree (i.e. the position of the bore HU in relation to the large-diameter front portion 13*b*) is selected such that the large-diameter front portion 13*b* does not penetrate the hydraulic buffer or penetrates it only slightly. During the return stroke, the large-diameter front portion 13*b* uncovers the stroke-length reversal bore and connects it to the supply line via the lower supply groove 32, as soon as the piston is positioned at a certain spacing above the theoretical impact area TAE during the return stroke. The line with the stroke-length reversal bore HU as well as the large-diameter front portion 13*b* are designed such that the stroke-length reversal bore is only connected to the supply line 3 via the piston when a position above the short-stroke bore KH is reached. The stroke-length reversal valve 33 operates against a biasing force by means of the pressure in the stroke-length reversal line HU and connects the stroke-length reversal bore HU by means of a throttle 22 in the long-stroke position—such as shown in FIG. 7, with the supply line 3 and in the short-stroke position with the line in which the signal for changing the setting of the spool valve 15 applies. The throttled connection to the supply line 3 ensures that the pressure in the stroke-length reversal bore that is connected to the actuation of the valve in the long-stroke position is maintained even if the stroke-length reversal bore is covered by the piston. In the short-stroke position, the throttled connection of the stroke-length reversal bore HU with the control line LH ensures that the low pressure level in the stroke-length reversal bore HU that resulted in the reversal of the valve 33 into the short-stroke position is maintained, even if the stroke-length reversal bore is covered by the piston. Furthermore, thanks to the holding bore, the stroke-length reversal valve 33 switches back into the long-stroke position when a pressure signal for reversal the spool valve 15 in the advance stroke is applied.

Figure 8:
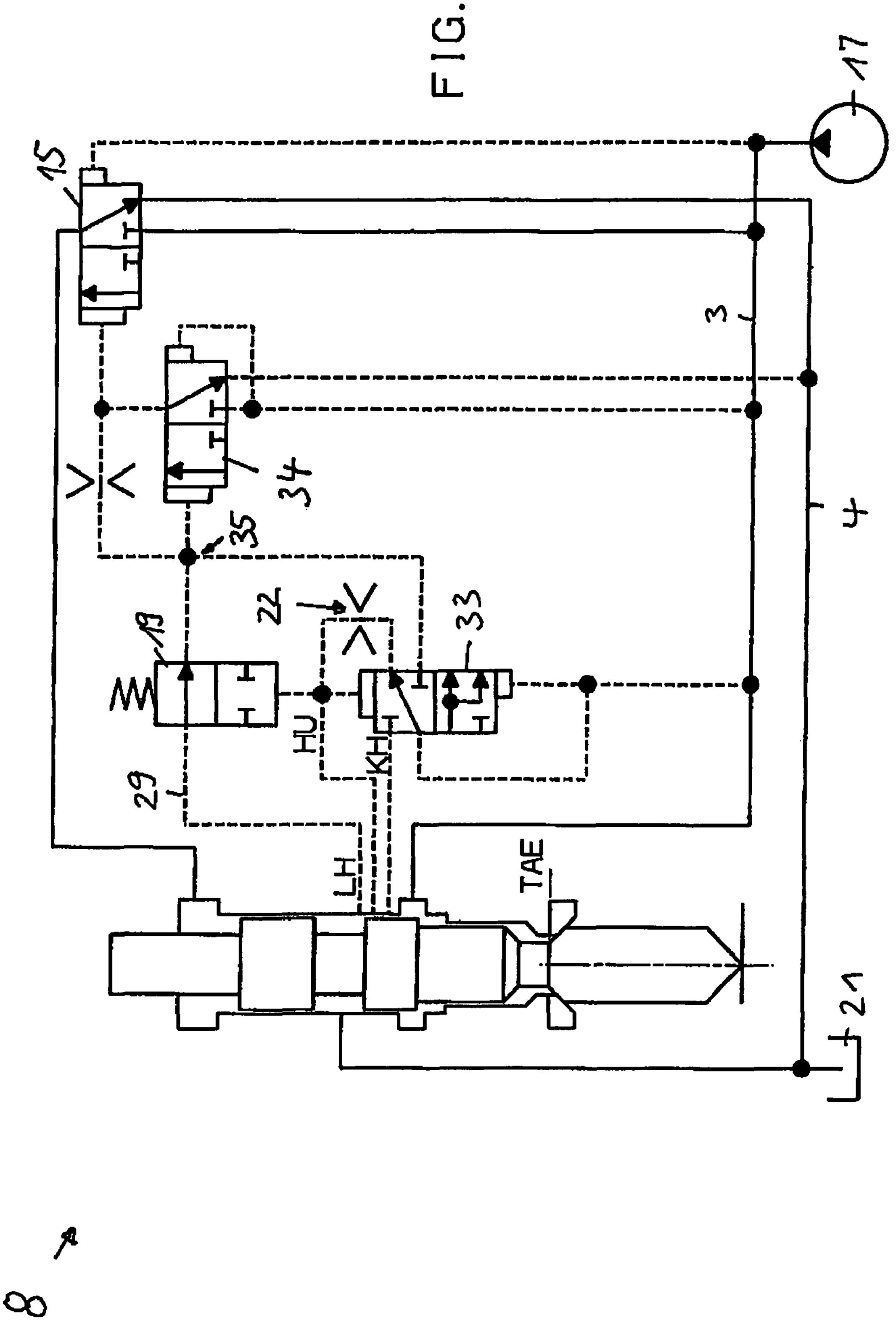

In the embodiment according to FIG. 8, in contrast to the embodiment described above, the long or short-stroke bores are not directly connected to the spool valve, but act on an additional shutoff valve 34 that, depending on the pressure in the LH bore, connects the control line via the spool valve either with the supply line 3 or the return line 4. The pressure-limiting valve 19 is provided in the LH line 29. Alternately, the pressure-limiting valve 19 may also be provided between the intersection 35 and the shutoff valve 34 so that neither a short-stroke nor a long-stroke signal can be applied to the shutoff valve 34 if the pressure-limiting valve is deactivated.

Figure 9:
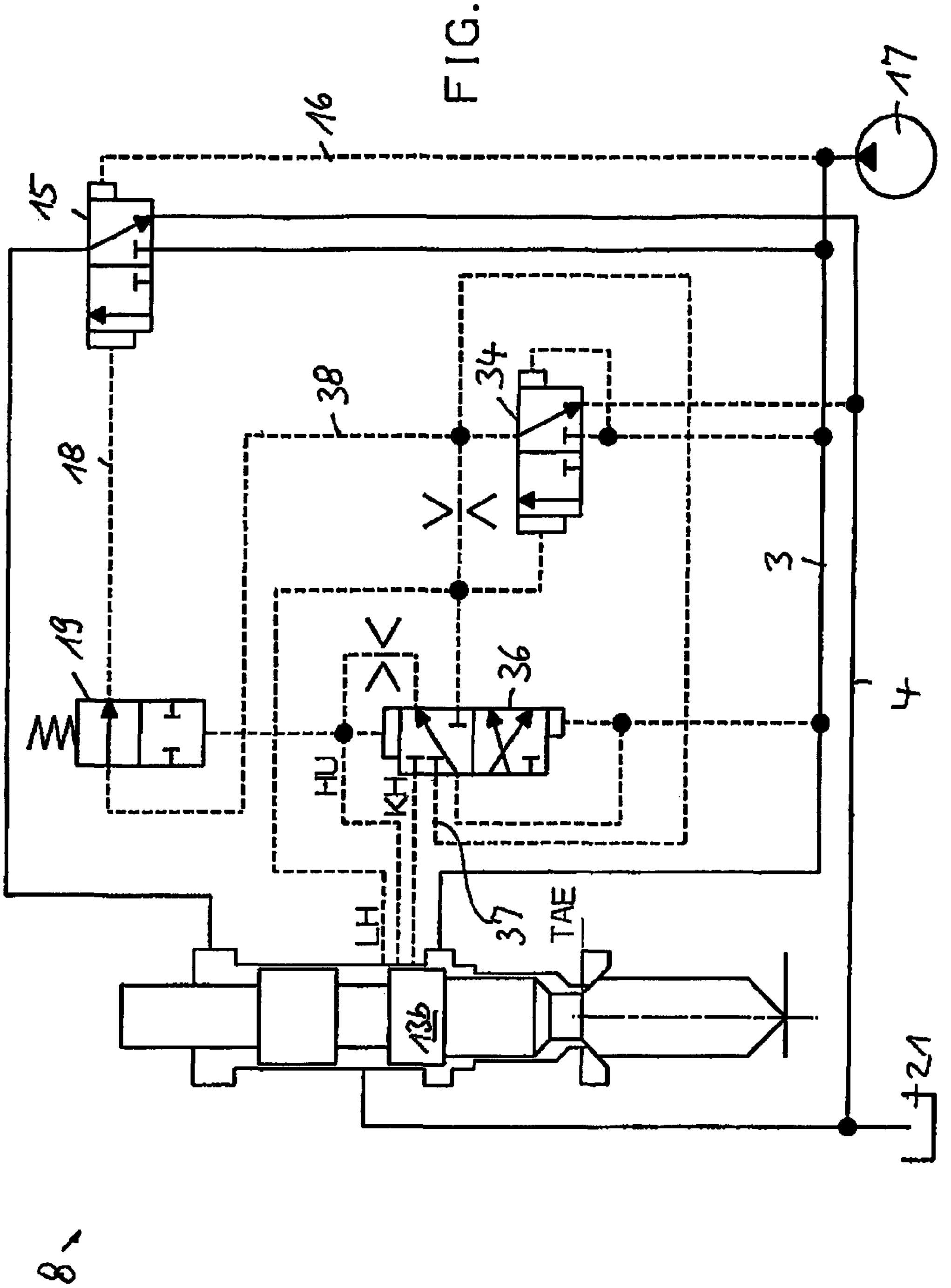

In the embodiment shown in FIG. 9, the pressure-limiting valve 19 is provided in the control line 18 between the shutoff valve 34 and the spool valve 15. Furthermore, the holding bore is no longer connected to the output of the stroke-length reversal valve 36 in the short-stroke position but is connected to the control line, i.e. the line between the shutoff valve 34 and the spool valve 15, through a further valve connection 37. In the short-stroke position, the stroke-length reversal bore HU is connected to the control line in a throttled manner, which line is again connected to the control area of the spool valve 15. By means of the throttled connection to the control line the low pressure level in the stroke-length reversal bore results in the reversal of the valve into the short-stroke position being maintained even if the stroke-length reversal bore is covered by the large-diameter front portion 13*b*. Furthermore, the stroke-length reversal valve 36 switches back into the long-stroke position when a pressure signal for setting the spool valve 15 into the advance stroke is received.

The embodiments illustrated in FIG. 10 to FIG. 15 have in common that the hammer is deactivated when the pressure limit is exceeded by means of a valve 19 and that furthermore a second pressure-relief valve 39 limits the pressure in the hammer supply line 3.

Figure 10:
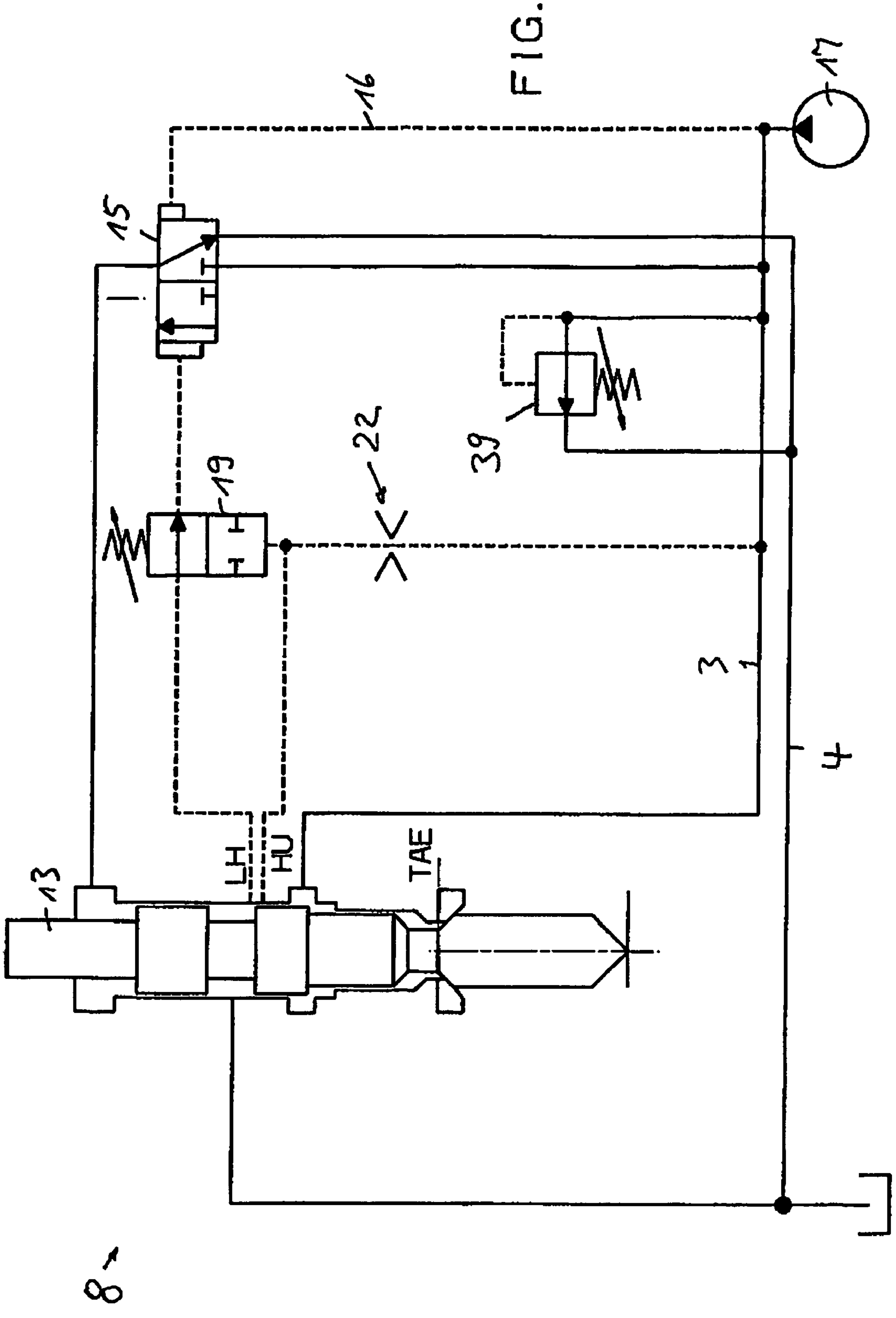

Thus, the embodiment according to FIG. 10, corresponds to the embodiment according to FIG. 2, provided that a pressure-relief valve 39 is provided between the supply line 3 and the return line 4. If the hammer is deactivated by means of the pressure-limiting valve 19, normally the supply-line pressure is increased since the hammer does not use any oil. In order to ensure that the supply pressure does not exceed a certain level, the pressure-relief valve 39 limits the supply line pressure. On the input side, the pressure-limiting valve is connected to the pressure line 3. If the pressure acting in the supply line exceeds the pressure set by the pressure-limiting valve, oil is guided to the return line. The actuating pressure of the pressure-relief valve 39 is supposed to be higher than that of the pressure-limiting valve 19. Of course, the pressure-relief valve may correspondingly be used in the other embodiments according to FIGS. 1 to 9 in a corresponding arrangement.

Figure 11:
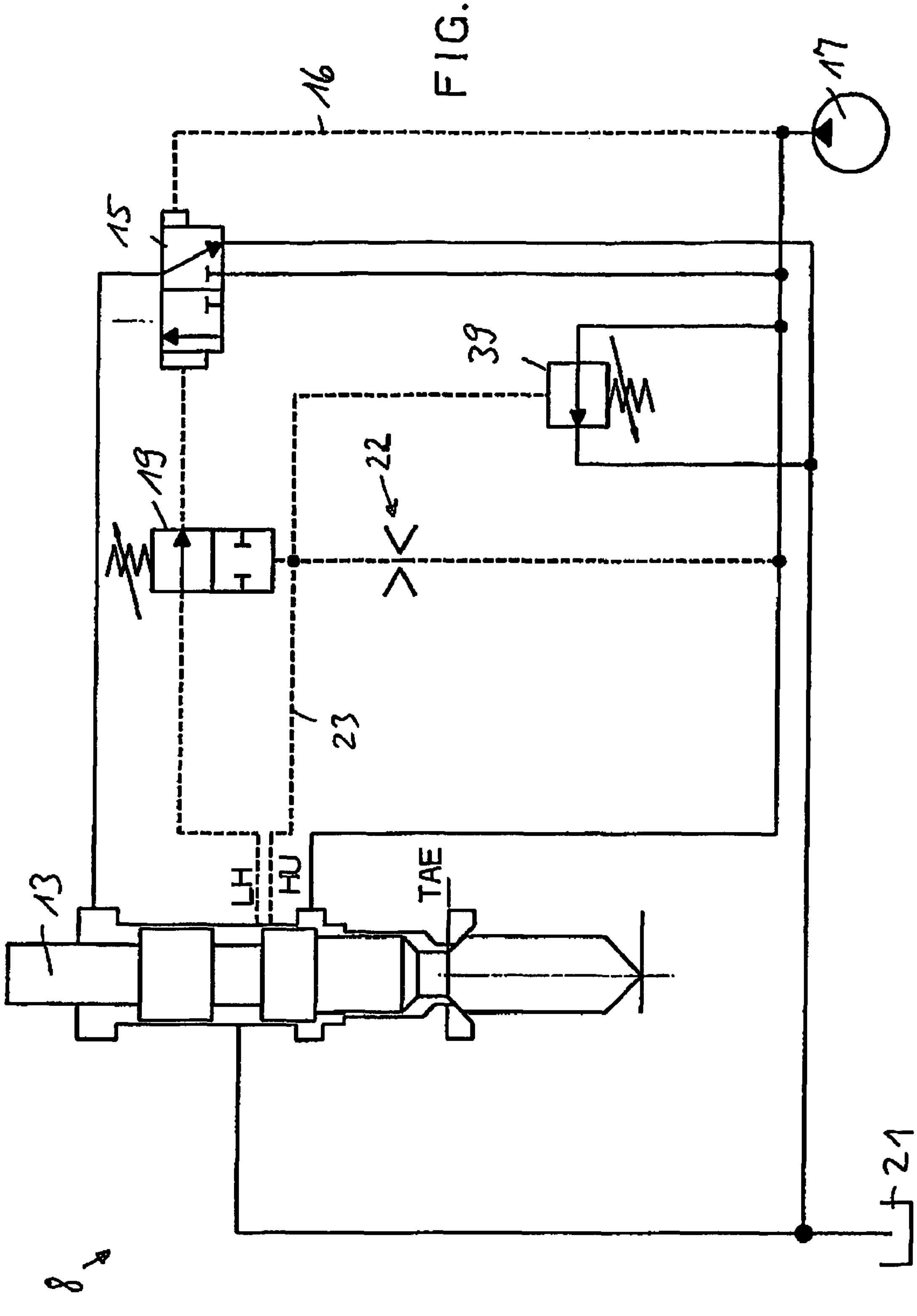

In the embodiment shown in FIG. 11, the pressure-relief valve is not directly controlled by the pressure in the supply line 3, but by the pressure in the signal line 23 of the pressure-limiting valve 19. By appropriately setting the pressure in the valve, namely a higher value for the actuation pressure set for the pressure-relief valve than for the pressure-limiting valve, the hammer is deactivated before the pressure-relief valve 39 is actuated. If the piston passes the theoretical impact area TAE to a certain extent in the forward direction, the pressure-limiting valve 19 and the pressure-relief valve are deactivated due to the depressurization of the signal line.

Figure 12:
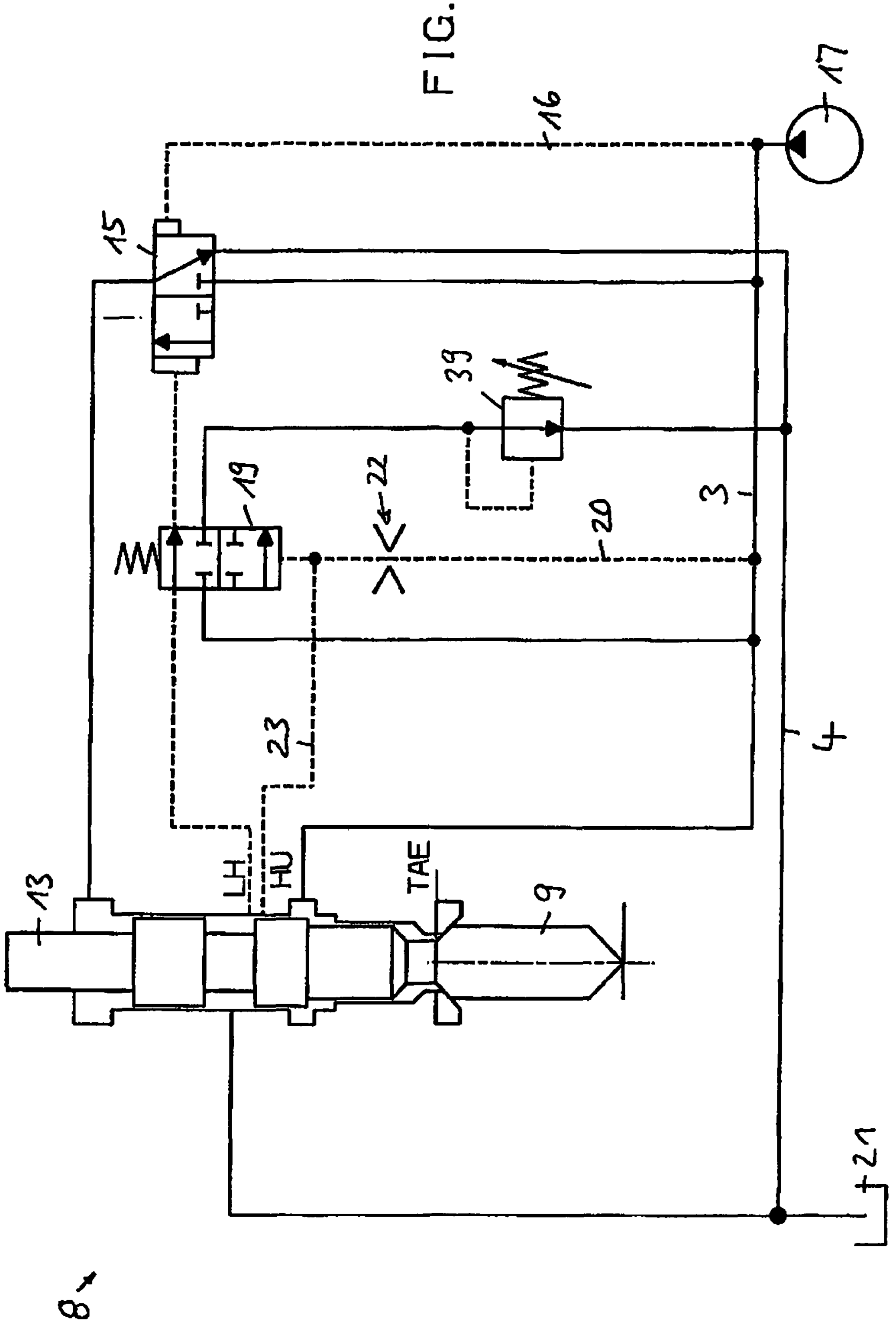

In the embodiment according to FIG. 12, the pressure-relief valve is only controlled by the pressure in the supply line 3 if the pressure-limiting valve is actuated. As a result deactivation of the hammer before the actuation of the pressure-relief valve 39 is realized.

Figure 13:
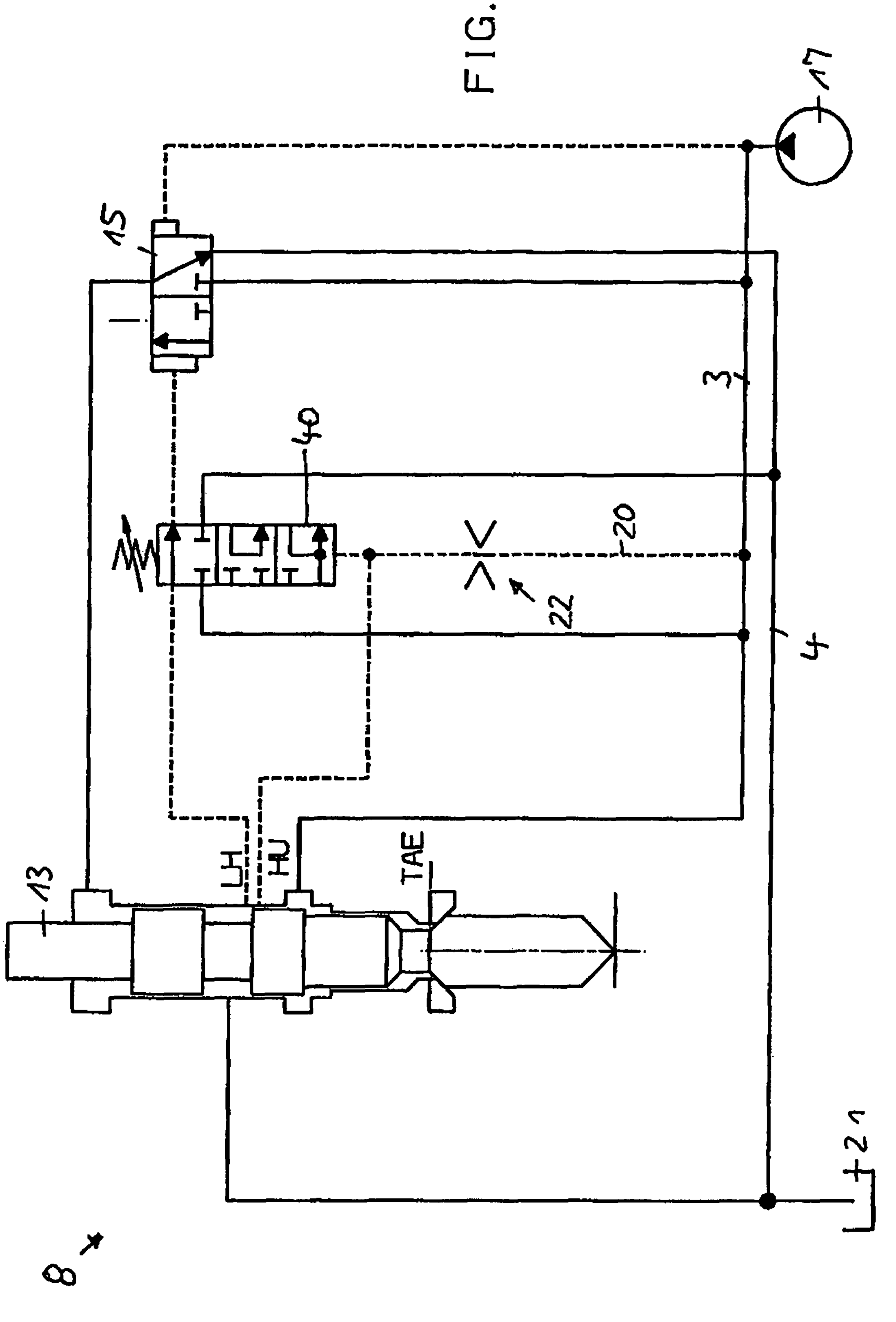

The embodiment according to FIG. 13 corresponds to the embodiment according to FIG. 11 but the pressure relief function of the valve 40 has been take over by the pressure-limiting valve. With increasing pressure in the signal line, the pressure line 3 is at first blocked and relieved optionally to the return line, if with increasing pressure an additional connection between the supply line and the return line is opened. The pressure-relief valve integrated into the valve 40 only becomes active if the pressure-limiting valve of the valve 40 has already deactivated the hammer.

Figure 14:
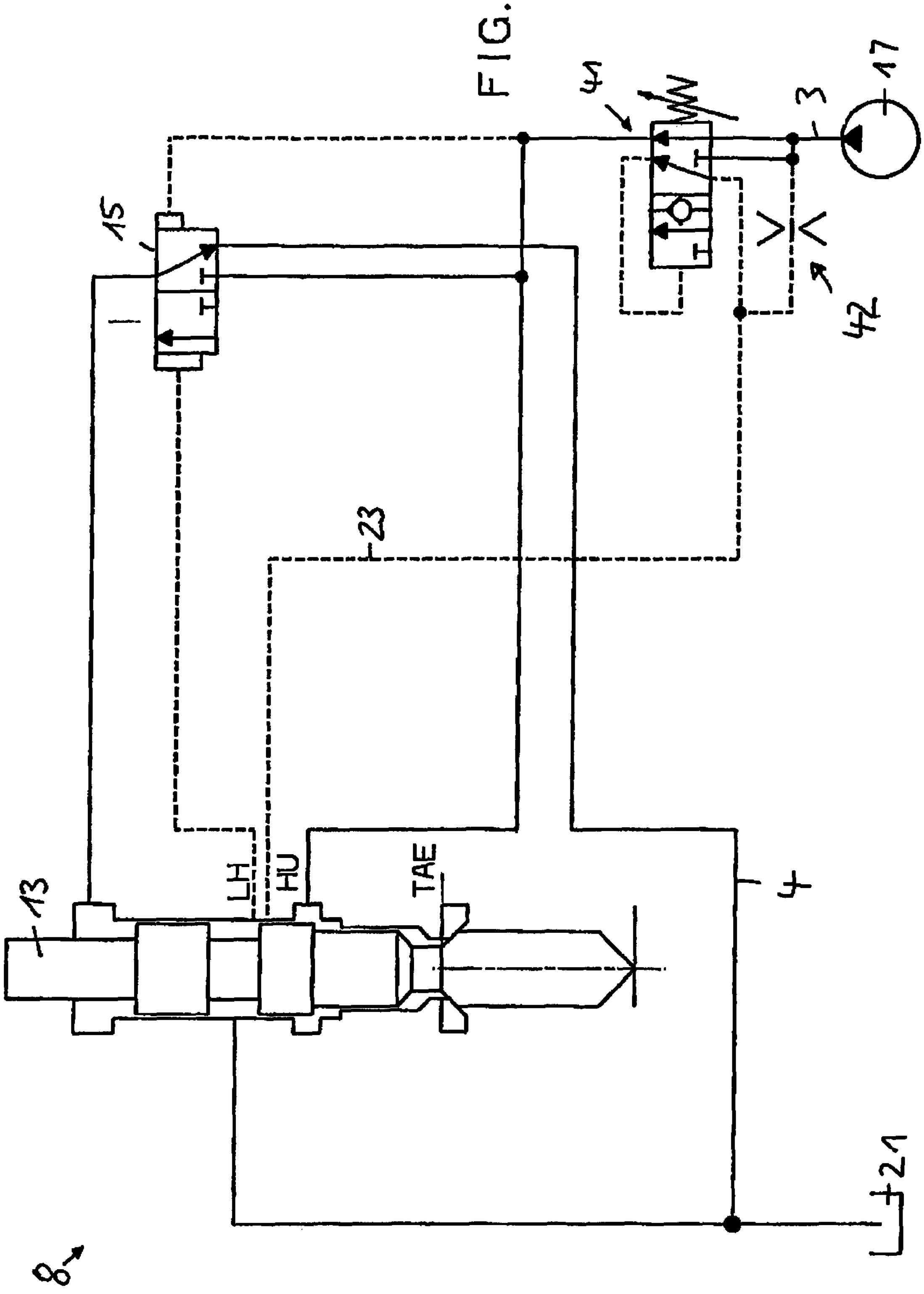

In the embodiment according to FIG. 14, a blocking valve 41 formed as a seat valve without leak oil serves for the disconnection of the hammer and the pressure line 3, when pressure exceeds a predetermined value in the signal line 23. The signal line 23 is connected to the pressure line, that is the supply line 3, via a throttle 42 and is connected to the return line 4 when the hammer piston 13 passes the theoretical impact area TAE when moving forward to a certain extent. When actuated, the valve 41 has a holding function separating the control area of the valve from the signal line and connecting it to the pressure in the supply line 3. This way, the valve is prevented from reversing when the supply line is blocked and the pressure downstream of the valve decreases.

Figure 15:
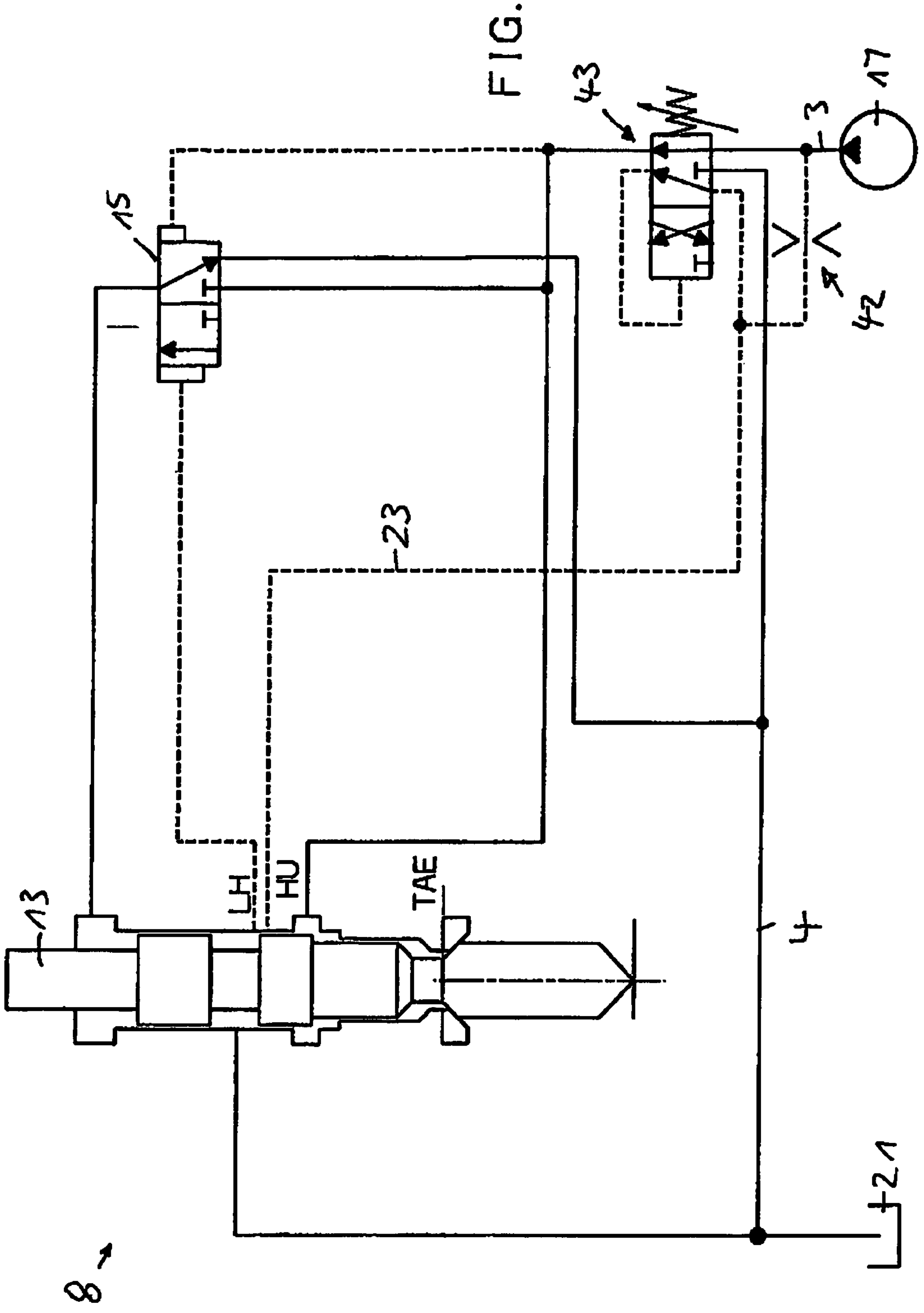

In the embodiment according to FIG. 15, a valve 43 is provided that when actuated as a spool valve having leak oil relieves the line behind the valve in addition to the return line 4. The blocking valves according to FIGS. 14 and 15 may also be controlled in an actuation arrangement according to FIG. 2 and FIG. 3 in a corresponding manner, the piston 13 in an idle stroke disconnecting the connection of the signal line to the supply line 3 and the signal line is not connected via a throttle to the supply line but to the return line 4.

Figure 6:
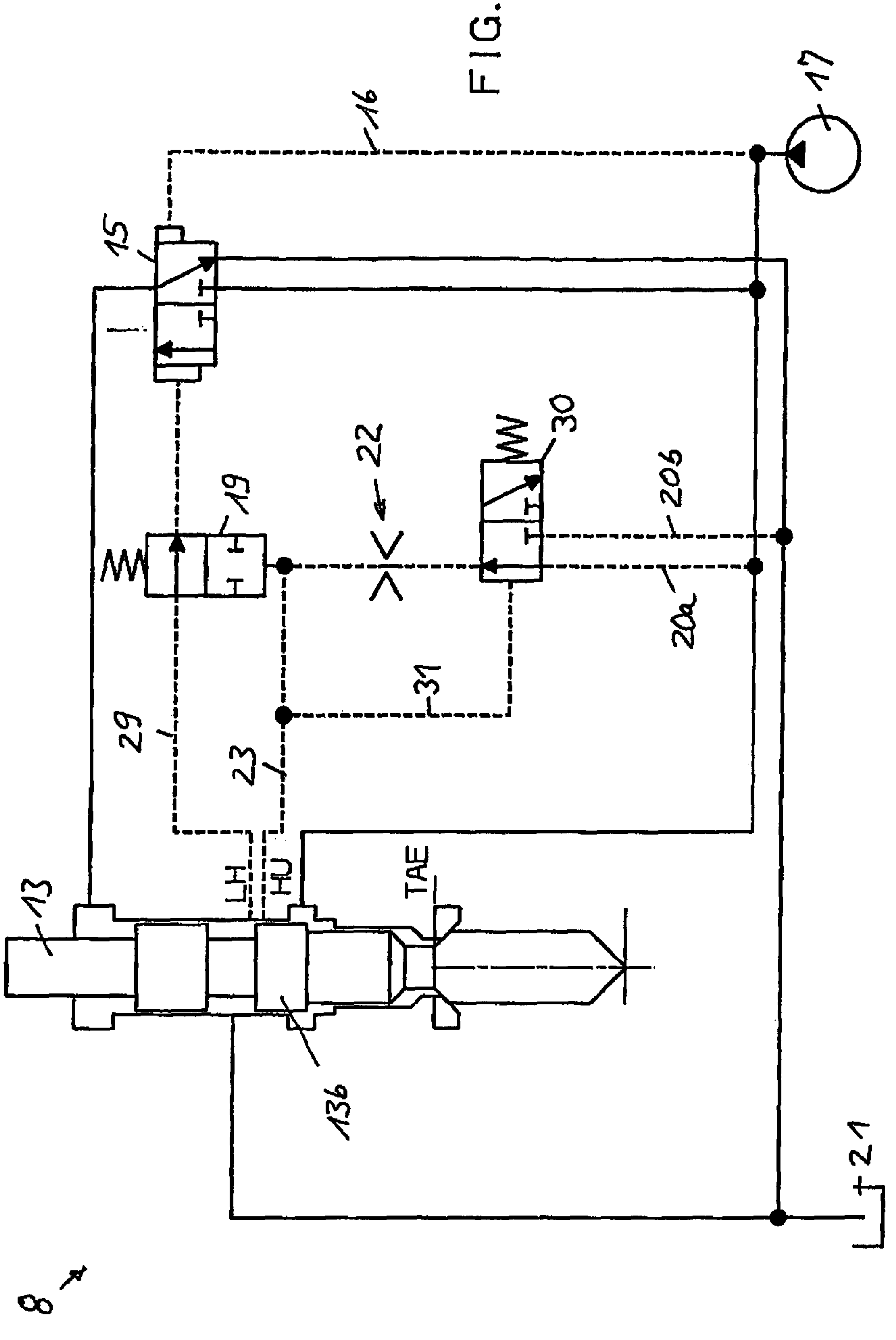

The blocking valves according to FIGS. 14 and 15 may also be controlled for maintaining the pressure prevailing in the signal line if the stroke-length reversal bore HU is covered by the piston with auxiliary valves corresponding to the embodiments according to FIGS. 5 and 6; furthermore, the signal line may be connected to the stroke-length reversal bore HU, as shown in FIGS. 7 to 9.

Figure 16:
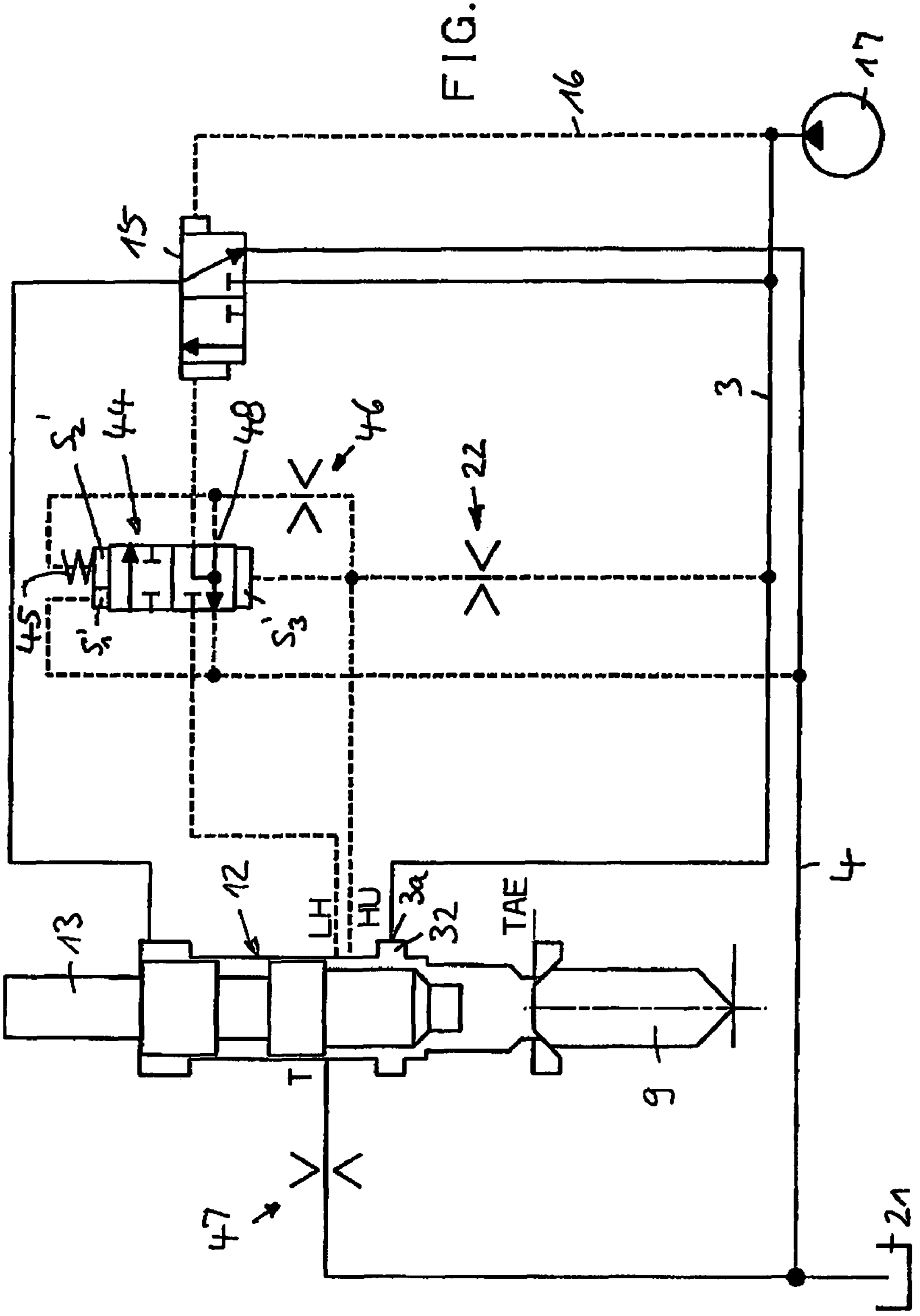

In the embodiment according to FIG. 16, the control valve 44 blocks the control line and relieves it to the return line 4 so that the control switches to the return stroke. The control valve 44 is provided with three control areas, two control areas S1 and S2 as well as the resetting (spring 45) being effective opposite to a third control area S3. The sum of the areas of the two control areas with the same orientation S1 and S2 corresponds to the area of the third control area S3. The two larger control areas S2 and S3 with different orientations are connected to each other by means of a throttle 46, the larger control area S3 being connected to the signal line. The pressure on the smaller control area S1 is relieved, e.g. by a connection to the return line. Compared to the control valve according to FIG. 3, the control valve 44 has a further connection 48 by means of which the middle control area S2 when deactivated may be connected to the return line. In operating position, the control areas generate a force counteracting the change in the setting caused by the spring 45, only one surface being effective that corresponds to the control area S1. If the control valve is actuated when deactivated, the middle area S2 is connected with the return line 4 by means of the connection 48. Oil flowing from the signal line and over the throttle 46 to the control area S2 is discharged through the connection 48 toward the sump 21. Thus, the pressure on the two areas with the same orientation S1 and S2 is relieved and the force counteracting the change in the setting is generated by the large control area S3. Even if the pressure in the signal line is decreased such that its level is lower than that of the deactivation pressure due to the change in the setting, the valve remains deactivated until the value falls below the value of a certain reset pressure. Thus, the spool valve remains in return-stroke position until the value falls below a value of a reset pressure and the hammer piston moves against its mechanic abutment when moving rearward. Furthermore, a bore T connected to the return line 4 meeting the central compartment of the working cylinder is positioned such in the working cylinder 12 that the hammer piston uncovers the bore T if the hammer piston passed the top dead point determined by the LH bore to a certain extent. Thus, oil can flow out from the lower supply groove 32, which is connected to the pressure line 3 by means of the bore 3*a* through the orifice 47, toward the return line 4. The orifice 47 is designed such that the pressure generated in the pressure line 3 does not exceed the operating pressure allowed, if the impact mechanism is deactivated, but suffices to keep the shut-off valve in shut-off position.

The invention claimed is:

1. A fluid-powered impact device comprising of a fluid-powered impact mechanism provided with a hammer piston that can be moved back and forth a controller provided with a pressure-limiting control valve or a shutoff control valve for moving the piston back and forth and for automatically deactivating the impact mechanism if the working pressure caused by the input pressure exceeds a predetermined peak value by either blocking the pressure line or stopping the controller in its end position corresponding to the working stroke of the piston or its end position corresponding the return stroke of the piston;

a hydraulic stop buffer for decelerating the hammer piston when a predetermined impact area is passed; and means for detecting when the hammer piston has passed the predetermined impact area and for deactivating the control valve while the hammer piston is in the hydraulic stop buffer.

2. The impact device according to claim 1 wherein the means for detecting includes a signal line connected to the control valve, the device being deactivated by a reduction of the pressure in the signal line to a value below the limit of the shut-off pressure set for the control valve.

3. The impact device according to claim 1 wherein the means for detecting includes a signal line connected to the control valve, the pressure level being maintained by an auxiliary valve or a throttle after the realization of the pressure level required in the signal line to the pressure-limiting valve for deactivating the pressure-limiting valve at least until the piston has reached or passed a theoretical impact plane in its return stroke.

4. The impact device according to claim 3 wherein after achieving the pressure level required for the deactivation, the pressure level in the signal line to the pressure-limiting valve is maintained by an auxiliary or a throttle at least until the hammer piston is moved out of the hydraulic stop buffer during the return stroke or, maximally, until the hammer piston triggers a signal during the return stroke for changing the position of a control valve into the advance stroke position.

5. The impact device according to claim 1 wherein the means for detecting includes a signal line connected to the control valve, the signal line of the pressure-limiting valve being at least temporarily connected to either the supply line or the return line within a limited area of the piston path.

6. The impact device according to claim 5 wherein the signal line is connected to the central compartment of the working cylinder and is at least partially uncovered by the hammer piston on its advance stroke once a predetermined impact plane has been passed and is then at least temporarily connected with the reverse stroke.

7. The impact device according to claim 5 wherein the signal line opens into the central compartment of the working cylinder and is covered by the hammer piston on advance stroke once the predetermined impact area has been passed and is thereby at least temporary disconnected from a hammer line connected with the supply line.

8. The impact device according to claim 1 wherein the pressure-limiting valve can be controlled via a stroke length reversal bore.

9. The impact device according to claim 1 wherein in the line between the central compartment of the working cylinder and the spool valve, in which the signal for changing the setting of the control valve depending on the position of the piston is due, a shutoff valve is provided connecting the section of the line on the side of the spool valve with the supply line or the return line depending on the pressure acting in the section of the line positioned on the side of the central compartment of the working cylinder, the pressure-limiting valve being provided between the shutoff valve and the spool valve.

10. The impact device according to claim 1 wherein in the line between the central compartment of the working cylinder and the spool valve, in which the signal for changing the setting of the spool valve depending on the position of the piston applies, a shutoff valve is provided connecting the section of the line on the side of the spool valve with the supply line or the return line depending the pressure prevailing in the section of the line positioned on the side of the central compartment of the working cylinder, the pressure-limiting valve being provided between the central compartment of the working cylinder and the shutoff valve.

11. The impact device according to claim 1 wherein bore holes with lines are provided in the central compartment of the working cylinder that are provided such that the piston uncovers a throttled connection between a line connected with the supply line and a line connected with the return once the hammer piston has passed its top or bottom dead end to a certain extent.

12. The impact device according to claim 1 wherein the control valve, preferably the pressure-limiting valve is provided with a control area that after the actuation in the shut-off position is connected to the pressure level, such that an additional operation force is effective in shut-off position.

13. The impact device according to claim 1 wherein a pressure-relief valve is also provided between the supply line and the return line.

* * * * *